(12) United States Patent
Billault

(10) Patent No.: US 12,209,556 B2
(45) Date of Patent: Jan. 28, 2025

(54) THRUST REVERSER PROVIDED WITH A LIGHTWEIGHT THRUST REVERSER FLAP

(71) Applicant: Safran Nacelles, Gonfreville l'Orcher (FR)

(72) Inventor: Romain Billault, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/340,533

(22) Filed: Jun. 7, 2021

(65) Prior Publication Data

US 2021/0293202 A1  Sep. 23, 2021

Related U.S. Application Data

(63) Continuation of application No. PCT/FR2019/052905, filed on Dec. 3, 2019.

(30) Foreign Application Priority Data

Dec. 7, 2018 (FR) ...................................... 18/72546

(51) Int. Cl.
   *F02K 1/82* (2006.01)
   *F02K 1/72* (2006.01)

(52) U.S. Cl.
   CPC ................. *F02K 1/827* (2013.01); *F02K 1/72* (2013.01); *F05D 2220/323* (2013.01); *F05D 2260/963* (2013.01)

(58) Field of Classification Search
   CPC .................................. F02K 1/827; F02K 1/72
   See application file for complete search history.

(56) References Cited

U.S. PATENT DOCUMENTS 3,587,973 A  *  6/1971  Wolf .......................... F02K 1/62
                                                           239/265.19
4,564,160 A      1/1986  Vermilye
                        (Continued)

FOREIGN PATENT DOCUMENTS

EP        3361082       8/2018
FR        3039517       2/2017
                    (Continued)

OTHER PUBLICATIONS

International Search Report for International Application PCT/FR2019/052905, mailed Apr. 6, 2020.
(Continued)

*Primary Examiner* — Ted Kim
(74) *Attorney, Agent, or Firm* — Burris Law, PLLC

(57) ABSTRACT

A thrust reverser includes a fixed structure and a movable structure defining an air stream, a flap including a single wall perforated on the surface thereof, and a structure strengthening the flap and having an acoustic function. The flap being articulated between the fixed structure and the movable structure to allow in a direct jet position, disposing the wall along an acoustic section of the movable structure and allowing the circulation of an air flow through the air stream, the acoustic section forming with the structure of the wall an acoustic resonator, and in a reverse jet position, disposing the wall to deflect an air flow passing through the air stream and allow the passage through the wall and through the air stream of a portion of the air flow deflected by the flap.

12 Claims, 4 Drawing Sheets

(56) References Cited

U.S. PATENT DOCUMENTS

| | | | |
|---|---|---|---|
| 5,927,647 A | 7/1999 | Masters et al. | |
| 2012/0097761 A1* | 4/2012 | Vache | F02K 1/72 |
| | | | 239/265.19 |
| 2016/0326985 A1* | 11/2016 | Hercock | F02K 1/72 |
| 2017/0225764 A1* | 8/2017 | Nampy | B64C 1/066 |
| 2018/0058373 A1* | 3/2018 | Gaw | F02K 1/70 |
| 2018/0148187 A1* | 5/2018 | Valleroy | F02K 1/827 |
| 2020/0102908 A1* | 4/2020 | Kelford | F02K 1/72 |

FOREIGN PATENT DOCUMENTS

| | | |
|---|---|---|
| RU | 2529282 | 9/2014 |
| RU | 2538348 | 1/2015 |

OTHER PUBLICATIONS

Search Report issued in corresponding RU Application 2021116611/12, dated Mar. 6, 2023, 2 pages.

\* cited by examiner

THRUST REVERSER PROVIDED WITH A LIGHTWEIGHT THRUST REVERSER FLAP

CROSS-REFERENCE TO RELATED APPLICATIONS

This application is a continuation of International Application No. PCT/FR2019/052905, filed on Dec. 3, 2019, which claims priority to and the benefit of FR 18/72546 filed on Dec. 7, 2018. The disclosures of the above applications are incorporated herein by reference.

FIELD

The present disclosure relates to a thrust reverser of a nacelle for a turbojet engine and more specifically a construction for a thrust reverser flap.

BACKGROUND

The statements in this section merely provide background information related to the present disclosure and may not constitute prior art.

An aircraft is propelled by several turbojet engines each housed in a nacelle accommodating a set of appended actuating devices relating to operation thereof and performing various functions when the turbojet engine is operating or stopped.

These appended actuating devices comprise in particular a mechanical thrust reversal system.

A turbojet engine nacelle generally has a substantially tubular structure comprising an air inlet upstream of the turbojet engine, a middle section intended to surround a fan of said turbojet engine, a downstream section intended to surround the combustion chamber of the turbojet engine and possibly incorporating thrust reversal means, and generally terminates in an ejection nozzle whose outlet is located downstream of the turbojet engine.

Modern nacelles are intended to accommodate a bypass turbojet engine capable of generating, via the blades of the rotating fan, a flow of hot air (primary flow) and a flow of cold air (secondary flow) which circulates outside the turbojet engine through an annular passage, also called the air flow path, formed between a fairing of the turbojet engine and an inner wall of the nacelle. The two air flows are ejected from the turbojet engine through the rear of the nacelle via the air flow path.

The role of a thrust reverser is, during landing of an aircraft, to improve the braking capability of the latter by redirecting forward at least a portion of the air ejected from the turbojet engine. In this phase, the thrust reverser obstructs at least one portion of the air flow path and directs the flow towards the front of the nacelle, thereby generating a counter-thrust which is added to the braking of the wheels and airbrakes of the aircraft.

In general, the structure of a reverser comprises a thrust reverser cowl movable between, on the one hand, a reverse jet position in which it opens in the nacelle a passage intended for the diverted air flow, and on the other hand, a direct jet position in which it closes the passage. In the case of a cascade-type thrust reverser, the reorientation of the air flow in the reverse jet position is performed by cascade vanes, associated with thrust reverser flaps which at least partially block the air flow path, the cowl having only a simple sliding function aiming at uncovering or covering these cascade vanes.

In turn, the thrust reverser flaps, also called blocking flaps are activated and driven by the sliding of the movable cowl until they come to at least partially obstruct the flow path downstream of the cascade vanes, so as to improve the reorientation of the flow of cold air.

In a known manner, in addition to the function of obstructing the air flow path, these thrust reverser flaps perform an acoustic function.

To achieve these acoustic and obstructing functions, these thrust reverser flaps are designed by assembling two walls spaced apart from each other so as to form an acoustic resonance box between a first pierced wall and a second solid wall.

In the direction of the flow of the air flow passing through a nacelle as previously described, the air flow comes into contact with the first wall of the thrust reverser flap. The first wall pierced on its surface allows the passage of a small portion of the air flow and diverts the other portion of the air flow in the direction of the cascade vanes provided for this purpose. The portion of the air flow passing through the first pierced wall is caught in the resonance box formed between the first wall and the second solid wall.

SUMMARY

This section provides a general summary of the disclosure and is not a comprehensive disclosure of its full scope or all of its features.

An aim of the present disclosure is to provide a thrust reverser comprising an improved thrust reverser flap making it possible to lighten the in-flight load of the thrust reverser while preserving the acoustic function and the obstructing function of such a flap.

In one form, the present disclosure relates to a thrust reverser of a turbojet engine nacelle for an aircraft, said thrust reverser including a fixed structure and a movable structure together delimiting an air flow path, at least one thrust reverser flap comprising a single wall, the wall being pierced on its surface so as to allow the passage through the flap of a portion of an air flow diverted by the flap. The wall comprises a structure stiffening the flap and having an acoustic function. The flap is articulated between the fixed structure and the movable structure to allow: in a direct jet position, disposing said wall of the flap along an acoustic section of the movable structure so as to allow the circulation of an air flow through the air flow path, said acoustic section forming with the structure of said wall an acoustic resonator, and in a reverse jet position, disposing said wall of the flap to divert an air flow passing through the air flow path and to allow the passage, through the wall of the flap and through the air flow path, a portion of the air flow diverted by the flap.

Unlike the prior art, the flap does not comprise a second solid wall integrated into the flap. The present disclosure then advantageously makes it possible to use the existing movable structure to form a second wall of the thrust reverser flap when the thrust reverser is in the direct jet position. Indeed, in the direct jet position of the thrust reverser, the wall of the flap is held to extend along the movable structure facing it. More particularly, the structure of the wall of the flap is maintained to extend along the movable structure facing the acoustic section of the movable structure.

It should be understood that the acoustic section of the movable structure must be solid so as to form a solid wall equivalent to that of the prior art.

By "solid section", it should be understood a surface inhibiting the passage of an air flow.

A flap as defined by the present disclosure makes it possible to reduce its weight and therefore also the weight of the thrust reverser carrying it.

In the direct jet position, the flap according to the present disclosure reduces air recirculation between the wall of the flap and the acoustic section of the movable structure, which limits the dimensioning of a connecting rod articulating the flap between the fixed structure and the movable structure.

In the reverse jet position, the pierced wall of the flap allows for a lower pressure differential on the flap.

In a non-limiting manner, said wall may be made of aluminum or of a thermoplastic material, or else of composite fibers in a matrix.

According to one form of the present disclosure, the structure of the wall of the flap is formed by a plurality of acoustic units.

Advantageously, the structure of the wall of the flap is dimensioned, in the direct jet position, so as to maintain between the structure and said acoustic section of the movable structure a predetermined clearance, preferably smaller than 3 millimeters.

Maintaining such a predetermined clearance makes it possible to perform the acoustic function of the acoustic resonator formed by the thrust reverser flap and the acoustic section of the movable structure, this being so in the direct jet position.

According to another form of the present disclosure, the thrust reverser is equipped with a spring maintaining said predetermined clearance between the structure of the flap and said acoustic section of the movable structure.

Advantageously, a portion of the structure of the flap is intended to receive the spring.

It should be understood that the spring is dimensioned to provide that the predetermined clearance is maintained.

Advantageously, the wall of the flap has an opening provided for the passage of a deploying mechanism of the flap, preferably a connecting rod, for attachment thereof to the spring.

According to another form of the present disclosure, an edge of said wall of the flap facing the fixed structure, in the reverse jet position, comprises a lip seal.

Advantageously, the lip seal is overmolded onto the edge of said wall.

Such overmolding of the lip seal is facilitated by the flap according to the present disclosure comprising a single wall.

The present disclosure also concerns a nacelle equipped with a thrust reverser as described in the present document.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
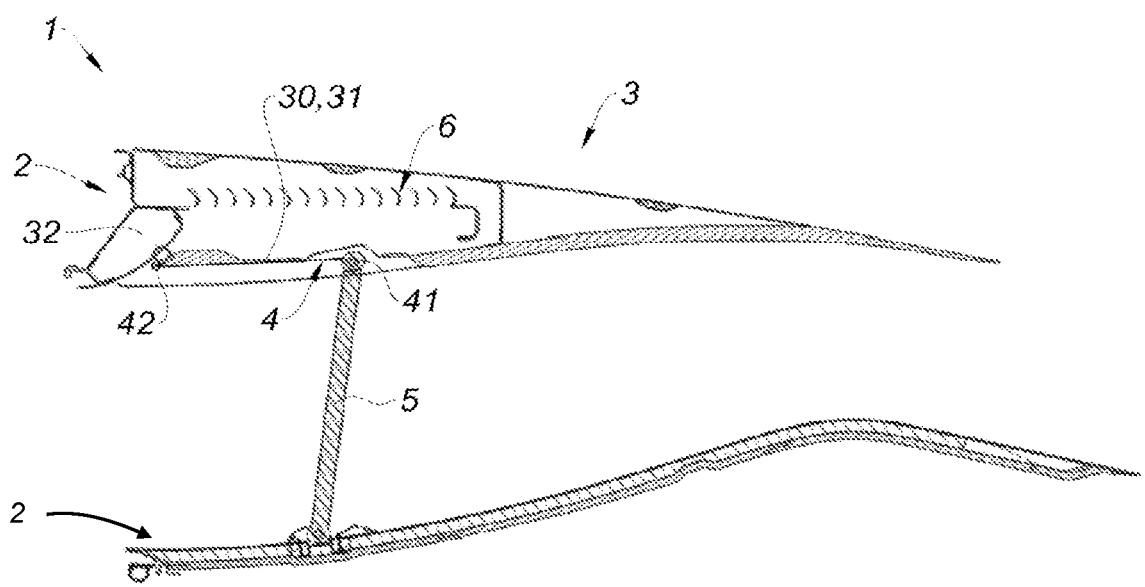
FIG. 1 illustrates a schematic cross-sectional view of a thrust reverser in a direct jet position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present document, the terms "upstream" and "downstream" should be understood with reference to the direction of circulation of the air flow passing through the air flow path of the thrust reverser.

Figure 2:
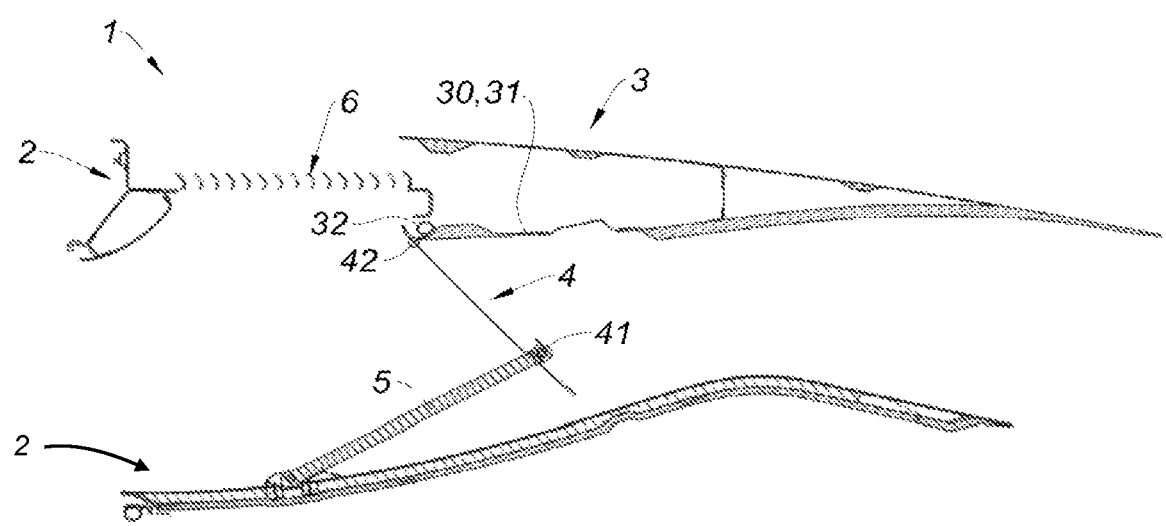
FIG. 2 illustrates a schematic cross-sectional view of the thrust reverser of FIG. 1 in a reverse jet position.

In FIGS. 1 and 2, there is represented a thrust reverser 1 of an aircraft turbojet engine nacelle, respectively in the direct jet and reverse jet positions.

As represented, the thrust reverser 1 includes a fixed structure 2 and a movable structure 3 together delimiting an air flow path.

A thrust reverser flap 4 articulated by a deploying mechanism of the flap 4, herein formed by a connecting rod 5, to allow its deployment during the translational displacement of the movable structure 3 relative to the fixed structure 2, is represented.

As represented, one end of the connecting rod 5 is secured to the fixed structure 2 while the other end is secured to an attachment point 41 of the flap 4.

Moreover, the flap 4 is mounted on the movable structure 3 by means of a pivot connection. The pivot connection is provided by two pivot points 42 of the flap 4.

When passing from the direct jet position to the reverse jet position, the translational displacement of the movable structure 3 relative to the fixed structure 2 allows the connecting rod 5 to drive the flap 4 via its attachment point 41. The flap 4 is then driven in rotation relative to the movable structure 3 via its two pivot points 42.

During its deployment, the thrust reverser flap 4 extends into the air flow path to divert the air flow passing therethrough.

The air flow passing through the air flow path is then diverted towards the cascade vanes 6 of the thrust reverser 1 such as to allow for a counter-thrust enabling thrust reversal.

During the passage from the reverse jet position to the direct jet position, the translational displacement of the movable structure 3 relative to the fixed structure 2 reaches an end-of-travel position when an O-ring gasket 32 carried by the movable structure 3, more particularly by the upstream end of an inner casing 30 of the movable structure 3, crashes against the fixed structure 2 of the thrust reverser 1.

Figure 3:
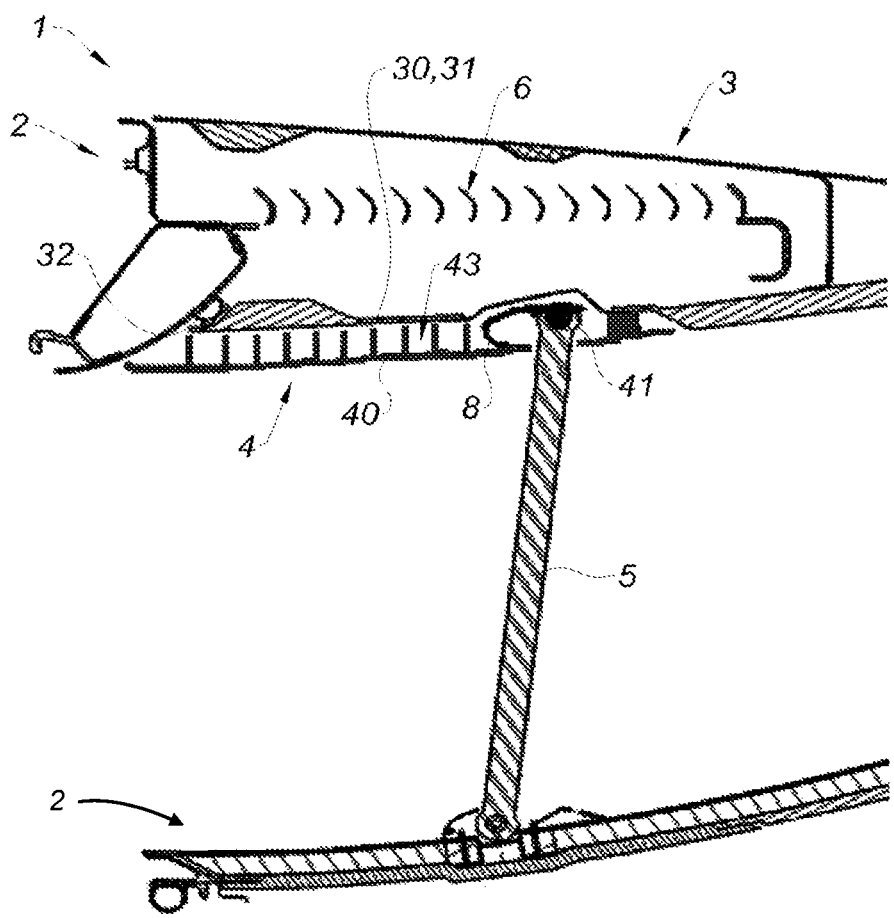
FIG. 3 illustrates a schematic cross-sectional view of a thrust reverser in the direct jet position equipped with a flap according to the present disclosure.

In FIG. 3, there is represented in more detail the flap 4 according to the present disclosure. FIG. 3 illustrates again the flap 4 of the thrust reverser 1 in a direct jet position.

As represented in FIGS. 3 to 7, the thrust reverser flap 4 comprising one single wall 40.

Figure 6:
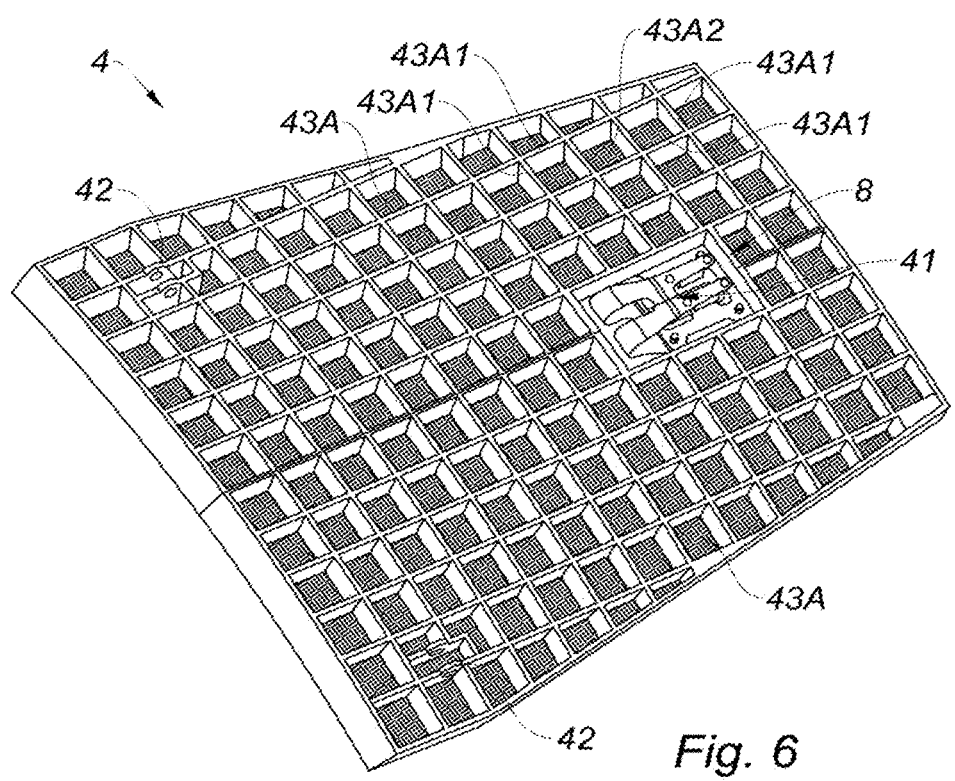
FIG. 6 illustrates a perspective view of the rear of a flap according to the present disclosure.
Figure 7:
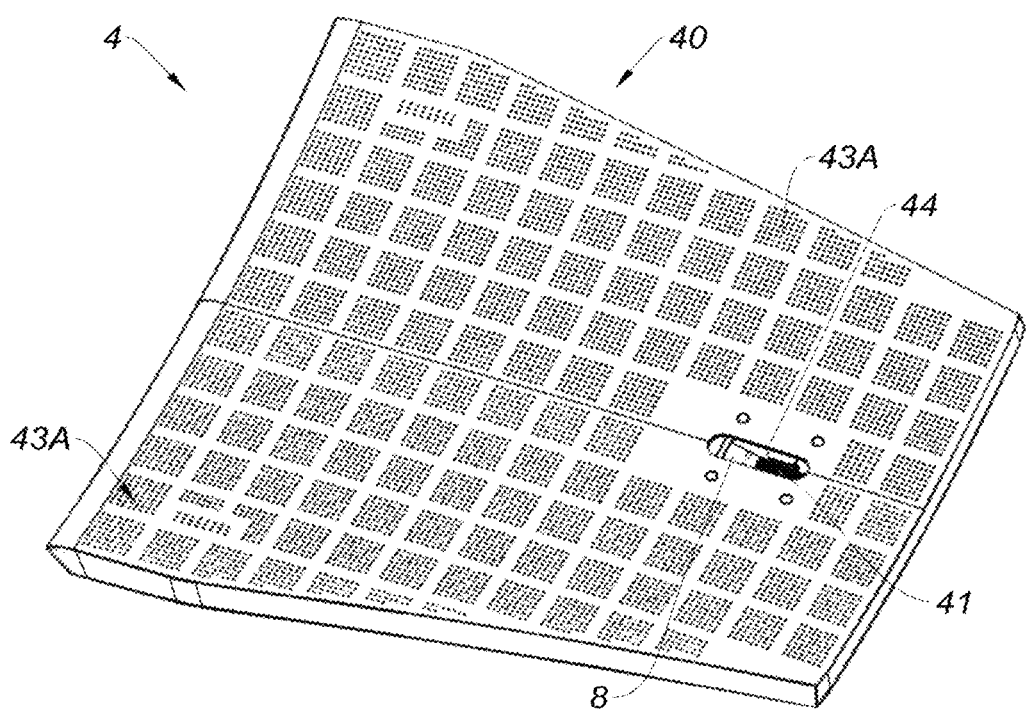
FIG. 7 illustrates a perspective view of the front of the flap according to the present disclosure.

Referring more particularly to FIGS. 6 and 7, the wall 40 is pierced on its surface so as to allow the passage through the flap 4 of a portion of an air flow diverted by the flap 4.

Moreover, referring again to FIGS. 3 to 7, said wall 40 comprises a structure 43 stiffening the flap 4 and filling an acoustic function of the flap 4.

The structure 43 stiffening the flap 4 is herein formed by a set of acoustic units 43A. More particularly, the structure 43 of the flap 4 is formed by a cascade vane advantageously extending from the wall 40 of the flap 4 to delimit the acoustic units 43A.

Referring to FIG. 7, the cascade vane advantageously bears on a non-pierced portion of the wall 40 of the flap 4.

Each acoustic unit 43A is then delimited by solid lateral partitions 43A1 and by a pierced bottom wall 43A2 corresponding to a portion of the wall 40 of the flap 4.

More particularly, the structure 43 of the flap 4 fulfills a first function consisting in stiffening the flap 4 when the latter is in the reverse jet position of the thrust reverser 1. Moreover, the structure 43 of the flap 4 fulfills a second function consisting in providing an acoustic function of the flap 4 when the latter is in the direct jet position of the thrust reverser.

Thus, in the reverse jet position, the single wall 40 of the flap 4 diverts the air flow passing through the air flow path. A portion of the air flow coming into the air flow path passes through the wall 40 of the flap via its pierced surface. It will be easily understood that the pierced surface of the wall 40 of the flap 4 makes it possible to reduce the pressure differential between the upstream section and the downstream section of the air flow path delimited by the flap 4 in the reverse jet position.

In the reverse jet position, the structure 43 of the flap 4 is located on the side of the downstream section of the air flow path thus delimited by the flap 4.

Figure 4:
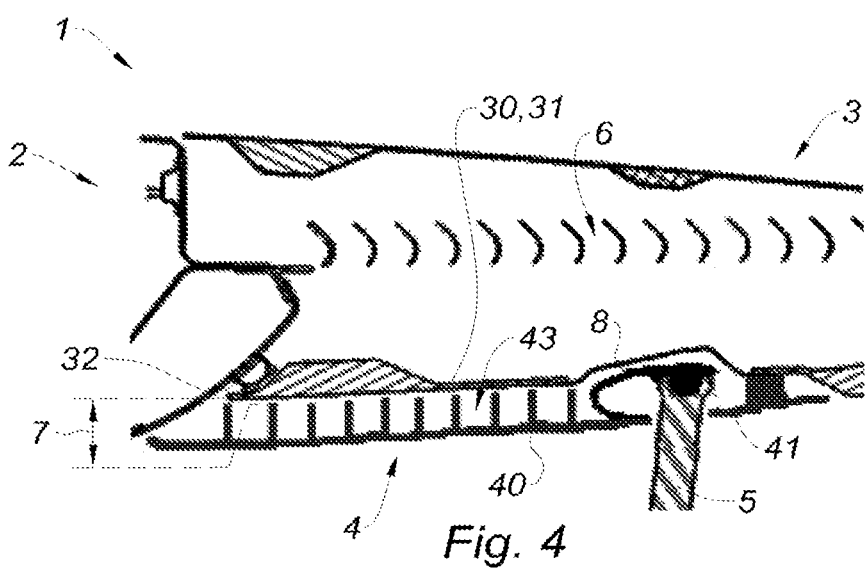
FIG. 4 illustrates an enlarged schematic cross-sectional view of a section of FIG. 3 to represent a predetermined clearance between the flap and the thrust reverser.
Figure 5:
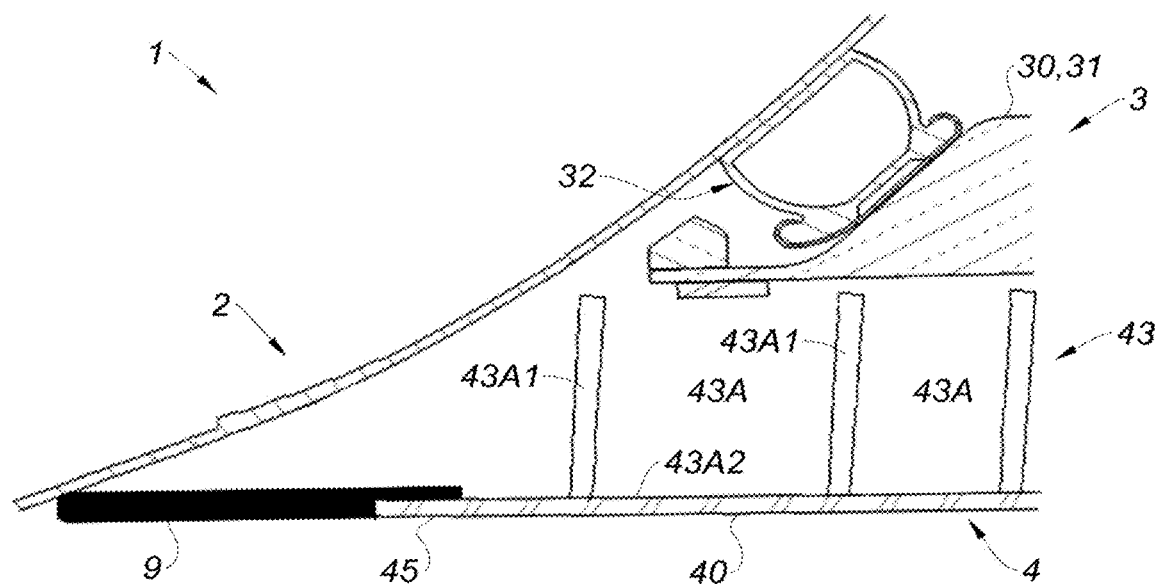
FIG. 5 illustrates an enlarged schematic cross-sectional view of a section of FIG. 4 to represent a lip seal disposed at the edge of a wall of the flap according to the present disclosure.

In the direct jet position, as illustrated in FIGS. 3 to 5, the single wall 40 of the flap 4 is held by the connecting rod 5 to extend along the movable structure 3 of the thrust reverser 1.

More particularly, the single wall 40 of the flap 4 is maintained so as to extend along an acoustic section 31 of the movable structure 3.

The acoustic section 31 of the movable structure 3 is herein formed by the inner casing 30 of the movable structure 3 radially delimiting the air flow path.

Thus, the structure 43 stiffening the flap 4 faces the acoustic section 31 of the movable structure 3.

The acoustic section 31 is advantageously solid so as to compensate for the absence of a second solid wall of the flap 4.

In this way, in the direct jet position, the wall 40 of the flap 4, more particularly the structure 43 of the wall 40 of the flap 4, forms with the acoustic section 31 of the movable structure 3 an acoustic resonator reducing air recirculation between the flap 4 and the acoustic section 31 of the movable structure 3.

The acoustic section 31 of the movable structure 3 then replaces a solid wall of the flap 4.

The flap 4 is then weight-lightened and its bulk in the thrust reverser 1 is reduced. The connecting rod 5 can then also be reduced in size.

As represented in FIG. 4, the structure 43 of the wall 40 of the flap 4 is dimensioned so as to maintain, in the direct jet position, between the structure 43 and said acoustic section 31 of the movable structure 3 a predetermined clearance 7.

More particularly, the predetermined clearance 7 is formed between, on the one hand, the ends of the structure 43 of the flap 4 extending from its pierced wall 40 and, on the other hand, the acoustic section 31 of the movable structure 3, this being so in the direct jet position of the flap 4.

The predetermined clearance 7 is advantageously intended to allow performing the acoustic function of flap 4 in the direct jet position. The clearance is advantageously smaller than 3 millimeters.

To facilitate the maintenance of the predetermined clearance 7 between the structure 43 of the flap 4 and the acoustic section 31 of the movable structure 3, the thrust reverser 1 could be equipped with a spring 8 maintaining the predetermined clearance 7.

In the direct jet position, the spring 8 then inhibits the wall 40 of the flap 4 from coming into contact with the acoustic section 31 of the movable structure 3 and provides more particularly the predetermined clearance 7.

As represented in more detail in FIG. 6, the spring 8 is intended to be received in a section of the structure 43 of the flap 4, advantageously distinctly from the honeycomb units 43A. The spring 8 is then fixed, by a series of screws, from the structure 43 of the flap 4 to emerge therefrom and inhibit the wall 40 of the flap 4 from coming into contact with the acoustic section 31 of the movable structure 3.

More particularly, the spring 8 is formed by curved and pre-stressed blades to secure the predetermined clearance 7. The ends of its blades protrude from the structure 43 of the flap 4 to provide the predetermined clearance 7.

The spring 8 of the flap 4 is advantageously configured to allow the attachment of the connecting rod 5.

The spring then forms the attachment point 41 of the flap 4. A portion of the structure 43 of the flap 4 is advantageously intended to receive the pivot points 42 of the flap 4.

As represented in FIG. 7, the wall 40 of the flap 4 has an opening 44 provided for the passage of the connecting rod 5, for attachment thereof with the spring 8 mounted on the side of the structure 43 of the flap 4.

Thus, the spring 8 advantageously has the function, on the one hand, of providing that the predetermined clearance 7 is maintained and, on the other hand, of enabling attachment of the deploying mechanism of the flap 4.

Moreover, the spring 8 is advantageously at least partly coincident with the structure 43 of the flap 4 in order to limit the bulk of the flap 4 in the air flow path.

Referring to FIG. 5, there is illustrated a detailed view of a flat edge 45 of the wall 40 of the flap 4. The flat edge 45 corresponds particularly to that facing the fixed structure 2 when the thrust reverser 1 is in the direct jet position.

Unlike the form illustrated in FIGS. 6 and 7, at least the flat edge 45 of the flap 4, described hereinabove, is formed by a flat surface extending the wall 40 linearly, more particularly in the continuity of the pierced surface of the wall 40 of the flap 4.

As illustrated, the flat edge 45 facing the fixed structure, in the direct jet position, comprises a lip seal 9 limiting the passage of air between the flat edge 45 of the flap 4 and the fixed structure 2. In the direct jet position, the lip seal 9 bears against the fixed structure 2.

The planar surface of the flat edge 45 of the flap allows the overmolding of the lip seal 9 directly thereon.

Of course, the present disclosure is not limited to the examples that have just been described and numerous modifications can be made to these examples without departing from the scope of the present disclosure. In particular, the different features, shapes, variants and forms of the present disclosure can be associated with each other according to various combinations to the extent that these are not incompatible or mutually exclusive. In particular, all previously-described variants and forms can be combined with one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser of a turbojet engine nacelle for an aircraft, said thrust reverser comprising:
    a fixed structure;
    a movable structure cooperating with the fixed structure to delimit an air flow path; and
    at least one thrust reverser flap comprising a single wall, said single wall being pierced on its surface so as to allow a passage through the at least one thrust reverser flap a portion of an air flow diverted by the at least one thrust reverser flap, said thrust reverser flap further comprising a stiffening structure connected to and extending away from the single wall to create open spaces, the single wall being exposed to air flow on both sides, and the stiffening structure stiffening the at least one thrust reverser flap and having an acoustic function, the at least one thrust reverser flap being articulated between the fixed structure and the movable structure to allow:
        in a direct jet position, disposing said single wall of the at least one thrust reverser flap along an acoustic section of the movable structure so as to allow circulation of an air flow through the air flow path, said acoustic section forming with the movable structure of said single wall an acoustic resonator, and
        in a reverse jet position, disposing said single wall of the at least one thrust reverser flap to divert an air flow passing through the air flow path and to allow the passage through the single wall of the at least one thrust reverser flap and through the air flow path a portion of the air flow diverted by the at least one thrust reverser flap.

2. The thrust reverser according to claim 1, wherein the single wall of the at least one thrust reverser flap is dimensioned, in the direct jet position, to maintain between the movable structure and said acoustic section of the movable structure a predetermined clearance, the predetermined clearance is smaller than 3 millimeters.

3. The thrust reverser according to claim 2, further comprising a spring maintaining said predetermined clearance between the at least one thrust reverser flap and said acoustic section of the movable structure.

4. The thrust reverser according to claim 3, wherein a portion of the at least one thrust reverser flap is configured to receive the spring.

5. The thrust reverser according to claim 3, wherein the single wall of the at least one thrust reverser flap has an opening provided for the passage of a deploying mechanism of the at least one thrust reverser flap for attachment thereof to the spring.

6. The thrust reverser according to claim 1, wherein an edge of said single wall of the at least one thrust reverser flap facing the fixed structure in the direct jet position comprises a lip seal.

7. The thrust reverser according to claim 6, wherein the lip seal is overmolded onto the edge of said single wall.

8. The thrust reverser according to claim 1, wherein said single wall is made of aluminum, a thermoplastic material, composite fibers, or composite fibers in a matrix.

9. The thrust reverser according to claim 1, wherein the stiffening structure forms a plurality of acoustic units.

10. A turbojet engine nacelle for an aircraft comprising a thrust reverser according to claim 1.

11. A thrust reverser of a turbojet engine nacelle for an aircraft, said thrust reverser comprising:
    a fixed structure;
    a movable structure cooperating with the fixed structure to delimit an air flow path; and
    at least one thrust reverser flap comprising a single wall, said single wall having a first surface facing the air flow path when the at least one thrust reverser flap is in a direct jet position and a second surface opposing the first surface, the single wall having pierced holes extending from the first surface to the second surface so as to allow a portion of an air flow diverted by the at least one thrust reverser flap to flow through the single wall, said thrust reverser flap further comprising a stiffening structure extending from the second surface away from the single wall and defining open spaces, both the first surface and the second surface of the single wall being exposed to air flow, and the stiffening structure performing a dual function of stiffening the at least one thrust reverser flap and having an acoustic function, the at least one thrust reverser flap being articulated between the fixed structure and the movable structure to allow:
        in the direct jet position, disposing said single wall of the at least one thrust reverser flap along an acoustic section of the movable structure so as to allow circulation of an air flow through the air flow path, said acoustic section forming with said single wall an acoustic resonator, and
        in a reverse jet position, disposing said single wall of the at least one thrust reverser flap to divert an air flow passing through the air flow path and to allow a portion of the air flow diverted by the at least one thrust reverser flap to pass through the single wall.

12. The thrust reverser according to claim 11, wherein the first surface and the second surface define a thickness of the single wall.

* * * * *